United States Patent [19]

Lopic et al.

[11] Patent Number: 5,208,525
[45] Date of Patent: May 4, 1993

[54] ELECTRIC POWER SUPPLY ASSEMBLY FOR A CORDLESS ELECTRIC APPLIANCE

[75] Inventors: Franz Lopic, Nersingen; Johann Katzer, Neu-Ulm; Wolfgang Lindermeir, Untermarchtal, all of Fed. Rep. of Germany

[73] Assignee: Gardena Kress + Kastner GmbH, Fed. Rep. of Germany

[21] Appl. No.: 776,853

[22] Filed: Oct. 15, 1991

Related U.S. Application Data

[63] Continuation of Ser. No. 446,132, Dec. 5, 1989, abandoned.

[30] Foreign Application Priority Data

Dec. 10, 1988 [DE]  Fed. Rep. of Germany ....... 3841735

[51] Int. Cl.$^5$ ................................................ H02J 7/00
[52] U.S. Cl. ............................................. 320/2; 310/50
[58] Field of Search .................. 30/DIG. 1; 173/217; 320/2, 3, 4, 5; 15/DIG. 1; 429/7, 9, 96, 97, 98, 99, 100; 310/50

[56] References Cited

U.S. PATENT DOCUMENTS

| | | | |
|---|---|---|---|
| 3,757,194 | 9/1973 | Weber et al. ........................ | 320/2 |
| 3,883,789 | 5/1975 | Achenbach et al. .................. | 320/2 |
| 3,911,663 | 10/1975 | Kern et al. ........................ | 368/204 |
| 3,952,239 | 4/1976 | Owings et al. ...................... | 320/2 |
| 3,969,796 | 7/1976 | Hodson et al. ............... | 339/91 R X |
| 3,973,179 | 8/1976 | Weber et al. ........................ | 320/2 |
| 4,032,806 | 6/1977 | Seely ................................ | 310/50 |
| 4,050,003 | 9/1977 | Owings et al. ...................... | 320/2 |
| 4,064,447 | 12/1977 | Edgell et al. ....................... | 320/2 |
| 4,084,123 | 4/1978 | Lineback et al. .................... | 320/2 |
| 4,191,917 | 3/1980 | Brown et al. ....................... | 320/2 |
| 4,391,882 | 7/1983 | Saruwatari ........................ | 429/96 |
| 4,431,245 | 2/1984 | Jigamian et al. ............... | 339/91 R |
| 4,481,458 | 11/1984 | Lane ................................. | 320/2 |
| 4,514,477 | 4/1985 | Kobayashi ........................ | 429/98 |
| 4,616,169 | 10/1986 | Proffitt ............................. | 320/2 |
| 4,751,452 | 6/1988 | Kilmer et al. ...................... | 320/2 |
| 4,835,410 | 5/1989 | Bhagwat et al. ................ | 320/2 X |
| 4,843,298 | 6/1989 | Brauch et al. ...................... | 320/2 |
| 5,054,563 | 10/1991 | Zapf ................................. | 173/217 |

FOREIGN PATENT DOCUMENTS

| | | |
|---|---|---|
| 0071356 | 2/1983 | European Pat. Off. . |
| 0255568 | 2/1988 | European Pat. Off. . |
| 2836907 | 3/1979 | Fed. Rep. of Germany . |
| 3140106 | 4/1982 | Fed. Rep. of Germany . |
| 8336872 | 3/1984 | Fed. Rep. of Germany . |
| 3502449 | 8/1985 | Fed. Rep. of Germany . |
| 8615789 | 12/1986 | Fed. Rep. of Germany . |
| 3610221 | 10/1987 | Fed. Rep. of Germany . |
| 3643558 | 7/1988 | Fed. Rep. of Germany . |
| 2108729 | 5/1972 | France . |
| 2232859 | 1/1975 | France . |
| 2282324 | 3/1976 | France . |
| 0121260 | 6/1986 | Japan . |
| 1422759 | 1/1976 | United Kingdom . |
| 1515390 | 6/1978 | United Kingdom . |
| 2173633 | 10/1986 | United Kingdom . |

OTHER PUBLICATIONS

Betriebstechnik Oct. 1988, pp. 73–74.

Primary Examiner—Steven L. Stephan
Assistant Examiner—Kristine Peckman
Attorney, Agent, or Firm—Quarles & Brady

[57] ABSTRACT

An electric supply device for the cordless operation of electrical appliances has a holder fixed to the electrical appliance for detachably locking and substantially exposing a mounting support of a storage unit. For electrical contact connection, approximately in the plane of a countersunk bearing surface, the storage unit has flat, rigid contacting contacts, with which are associated corresponding countercontacting contacts in the vicinity of the associated counterbearing surface of the holder. The contacting contacts are proximate to a hinge axis formed by a projecting hinged cam and a cam pocket between the storage unit and the holder, so that a favorable leverage is obtained. For detachable locking, two separately, but simultaneously, operable locks are provided in the vicinity of the other end of the storage unit, in which the holder is substantially embedded.

30 Claims, 8 Drawing Sheets

ELECTRIC POWER SUPPLY ASSEMBLY FOR A CORDLESS ELECTRIC APPLIANCE

This is a continuation of application Ser. No. 446,132, filed Dec. 5, 1989 (now abandoned).

BACKGROUND OF THE INVENTION

FIELD OF THE INVENTION

The invention relates to an electric power supply device for cordless power supplied units or equipment and in particular for portable equipment, such as portable hand drills and screwdrivers, electrical gardening equipment, etc. The supply device has a power storage unit connected to normally open circuit of the equipment and which at least partly supplies the working current. The storage unit is connected to a mounting support, which at least produces the electrical connecting line between the storage unit and the circuit, or even essentially mounts the complete storage unit. For producing the electrical connecting line between the mounting support and the storage unit, detachable contact pairs are provided, of which at least one comprises contacting contacts, which are arranged on the mounting support and the storage unit, the contacting contacts being provided in the vicinity of the bearing and counterbearing surfaces of the storage unit and the mounting support. The storage unit and mounting support are interconnected or detached from one another by an at least partial movement at right angles to said bearing and counterbearing surfaces.

U.S. Pat. Nos. 4,084,123 and 4,191,917 disclose supply devices, in which the box-like storage unit is so inserted in a pocket on the underside of the equipment casing, that only a relatively small part of the storage unit is exposed at the bottom. The contacting contacts of the storage unit are formed by pins projecting either upwardly or at right angles to the bearing and counterbearing surfaces, which are in linear engagement with the contacting contacts of the equipment embedded within the equipment casing and positioned above the pocket cover. The contacting contacts can be formed by leaf spring legs. The spring legs are pressed into an upright position over a relatively long spring deflection during the insertion of the storage unit, making it difficult to ensure a reliable electric contact over a large surface area. In addition, even with the storage unit removed, it is scarcely possible to check the state of the leaf spring legs. The contacting contacts of the storage unit project over the top thereof in an impeding manner and can therefore be easily damaged.

German patent 36 10 221 e.g. discloses power supply devices in which the contacting contacts are located in the vicinity of engagement surfaces of the storage unit and mounting support. However, these engagement surfaces are formed by faces located parallel to one plug-in direction of the release or insertion movement, so that it is not possible to ensure an adequate and reliable contact pressure between the contacting contacts of the contact pairs. In addition, the contacts are not readily accessible and the contacting surface is small.

Finally, e.g. French patent 22 82 324 discloses power supply devices, in which the contact pairs comprise plug pins and sockets, which require a high positional accuracy for providing a safe connection and can also be easily rendered inoperative by contamination.

SUMMARY OF THE INVENTION

An object of the invention is therefore to provide an electrical power supply device of the aforementioned type, which ensures safe and easy handling.

According to the invention, this object is achieved in that at least one contact pair is formed by contacting contacts, in which the contact face of at least one contacting contact is located substantially in a plane diverging from a position at right angles to the bearing or counterbearing surfaces and is preferably roughly parallel to the associated bearing or counterbearing surface or is at the most at an acute angle thereto. At least one of these contacting contacts, and in particular that contact whose contact face is located in said plane, is resiliently flexible at right angles to said plane, so that said contacting contact can have a very short spring deflection with a very high spring progression, resulting in a high contact pressure. As a result of the described construction, the contacting contacts can be exposed in easily accessible manner. Therefore, their state can be checked at any time or they can be cleaned by machining if they have become oxidized. In addition, without any significant additional space requirement, they can be provided with relatively large-area, substantially planar contact faces, so that they ensure large line cross-sections. In the particular case of flat construction from contact sheet metal, the contacting contacts can also be positioned in an adequately protected manner, so that they are secure against mechanical damage.

Appropriately, both the contacting contacts of at least one contact pair, and preferably all contact pairs, have flat, elongated, strip-like contact faces, which are substantially equal size and engage in an approximately congruent manner. Despite their size, the contacting contacts can be closely juxtaposed in a confined space. The contact faces can be juxtaposed in parallel and have a limited reciprocal spacing, which is significantly smaller than their strip width. In addition, longitudinally connecting extensions of the contacting contacts can form connecting conductors and the angular extensions can have the same strip width as the contacting contacts. The aforementioned and other extensions can also be in the form of securing members or connecting lugs for the contacting contacts, so that an extremely simple construction is obtained.

With respect to the associated bearing or counterbearing surface, the contacting contacts can be either transversely displaced or be located on an offset region of said surface. However, it is particularly advantageous if the contacting contacts are located approximately in the plane of the associated bearing or counterbearing surface, which can in turn be constructed in either stepfree or continuous and planar manner. One contacting contact per contact pair, and in particular the one located on the storage unit, can be positionally rigid, e.g. by being arranged in such a way that with its side remote from the contact face, it engages flat on a support face, e.g. on an outer face of a carrier or a casing, so that it projects with its metal thickness over said outer face. However, the particular contacting contact can also be located in a depression adapted to its width or can engage in said depression with end legs and can be resiliently supported on the bottom of said depression, so that despite a one-part construction the transversely movable contacting contact can be arranged in protected manner with contact springs connected to both ends. A particularly advantageous further development of the invention results from the contact pairs being located relatively close to a hinged joint, about which the storage unit can pivot during insertion or release with respect to the holder and whose joint parts can be separated from one another in the form of a plug connection. This gives advantageous leverage and easy operation for contact pressing.

For the detachably securing of the storage unit and the holder with respect to one another, at least one lock can be provided, which is located in the vicinity of the storage unit remote from the contacting contacts, but is set back with respect to said end and is accessible from the side for operation purposes, so that the risk of accidental unlocking is very small. This can also be achieved by providing two separate, and in particular, equiaxial locks, which are preferably constructed in such a way that the two locks must be simultaneously operated for unlocking purposes. The actuating handles can be located on opposite sides with such a small reciprocal spacing, that they can be simultaneously reached with two fingers of one hand. Thus, in the operated state, a hand grip for the storage unit is formed, so that the latter can in one-handed manner be unlocked and removed or inserted.

Although the holder can be constructed as a fixed or one-part component of the appliance, it is appropriately constructed as a separate component, so that the same holder can be positioned on different appliances, and therefore on all such appliances, the same storage unit or units can be used. The holder can be constructed and arranged in such a way that, in the assembled state, the storage unit is substantially completely free on the outside of the appliance and consequently essentially forms a continuous extension of the appliance casing, e.g. in such a way that the lateral faces of the storage unit and its one end are connected substantially flush to corresponding outer faces of the appliance. In addition, the holder and the storage unit can be constructed in such a way that, in the assembled state, the holder is substantially completely inserted or embedded within a receptacle of the storage unit, so that the contacting contacts are laterally shielded. If the holder is constructed in a substantially flat web-like manner, then it only takes up a limited amount of space. A particularly reliable hold of the storage unit is ensured if it is secured with respect to the holder in positive manner exclusively in the vicinity of three points, which are appropriately located at the angles of an imaginary acute triangle and can be provided in a plane sloping to the bearing or counterbearing surfaces in such a way that one point is set back with respect to the plane of the bearing surface of the storage unit. This point can be formed by a hinged cam on the associated storage unit end which is much narrower than the storage unit width. At least one further point is appropriately outwardly displaced with respect to the bearing surface.

The inventive supply device is suitable e.g. for the operation of grass cutters, turbotrimmers, shears, such as hedging shears, drilling machines, electric screwdrivers, vacuum cleaners, etc., and it is possible to provide the holder directly either on the engine casing or on a grip connected thereto by means of a handle. The power supply device can e.g., be used as a starter battery for an internal combustion engine, such as for a lawnmower. The storage unit can also be arranged separately from the appliance and connected thereto by an electric cable. The holder located on the appliance can also be constructed for connection to a random power supply, such as a battery, so that the appliance can be operated via a holder-connected car plug in the cigarette lighter socket of a motor vehicle with the battery thereof or via a high power transformer.

The storage unit can also have batteries or rechargeable storage cells, so that it essentially forms a battery or accumulator pack. For charging purposes, it is possible to use either rapid chargers, with an average load of 3 to 5, or even up to 10, A, or normal chargers with an average load of approximately 1.2 A. It is also conceivable to use chargers supplied by means of solar cells. For charging with a relatively low load, the storage unit appropriately has a separate and at least bipolar auxiliary connection, so that charging is only possible when the storage unit has been inserted in or mounted on the holder. Alternatively, charging can take place through the contacting contacts and a third contacting contact or contact pair provided for charge or load regulating purposes. The charge regulator can operate thermally, so that it also responds if the storage cell is damaged.

BRIEF DESCRIPTION OF THE DRAWINGS

These and further features of preferred developments of the invention can be gathered from the claims and description, as well as the drawings. The individual features can be realized singly or in the form of subcombinations in an embodiment of the invention and in other fields and constitute advantageous constructions for which protection is hereby claimed. Embodiments of the invention are described hereinafter relative to the drawings, wherein:

DETAILED DESCRIPTION OF THE PREFERRED EMBODIMENTS

Figure 1:
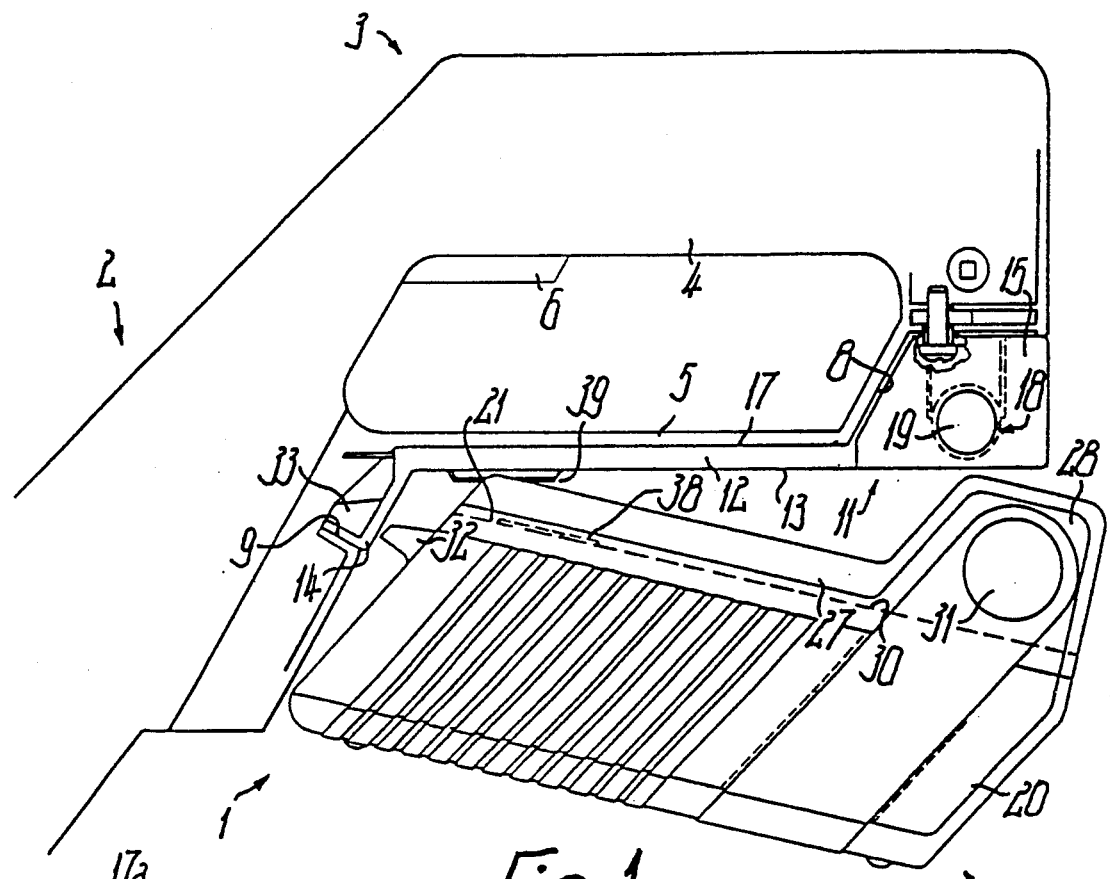
FIG. 1 shows an inventive power supply device in a partly assembled side view.
Figure 5:
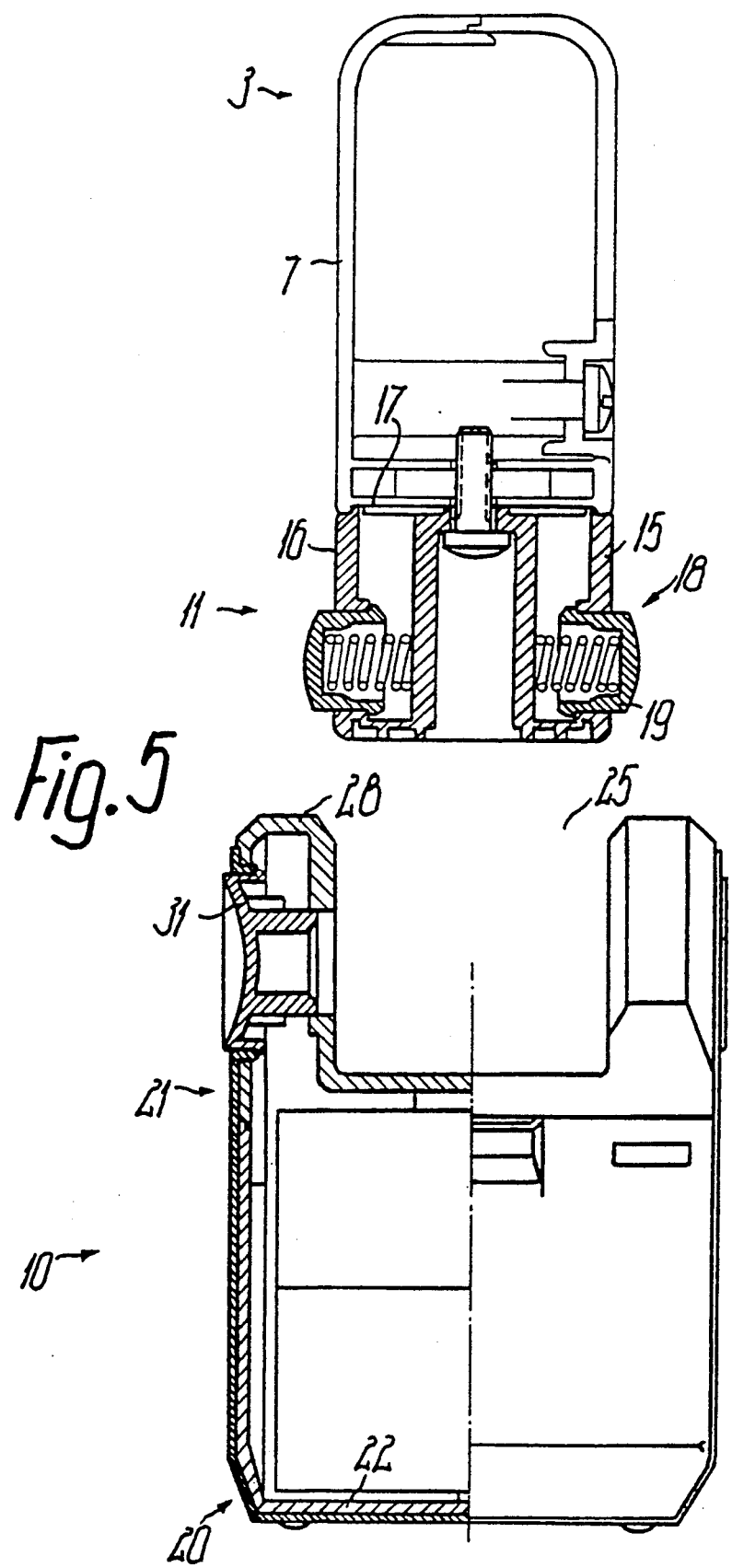
FIG. 5 shows a cross-section through the right-hand area of FIG. 1 on a larger scale.
Figure 6:
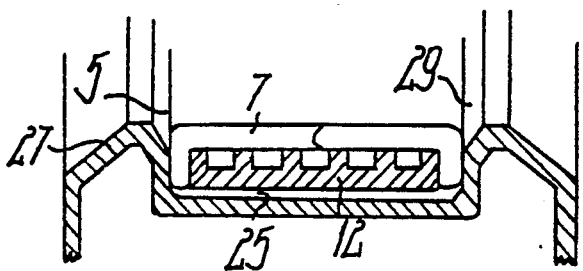
FIG. 6 shows a cross-section through the central region of FIG. 1, but in the assembled state.
Figure 7:
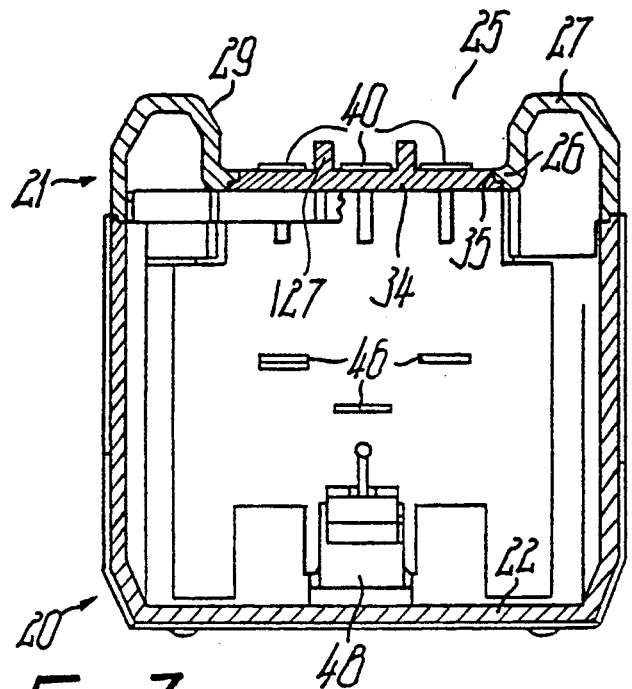
FIG. 7 shows a cross-section through the left-hand region of the storage unit according to FIG. 1.
Figure 8:
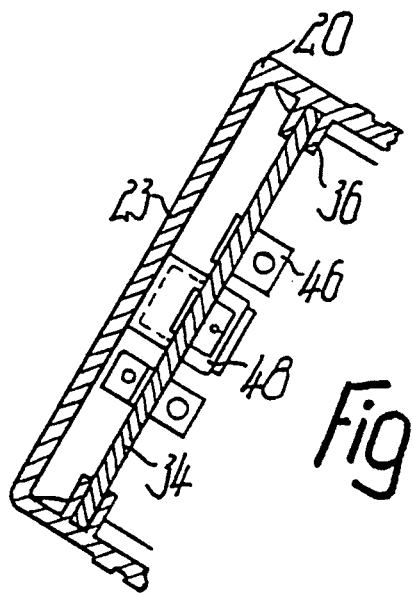
FIG. 8 shows a sloping partial section of the left-hand region of the storage unit according to FIG. 1.
Figure 9:
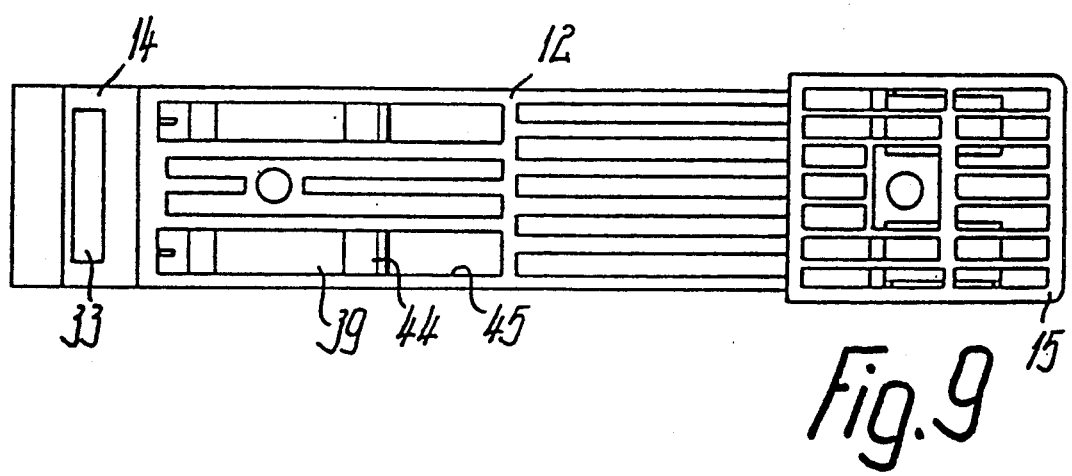
FIG. 9 shows a holder according to FIG. 3 in a view from below.
Figure 10:
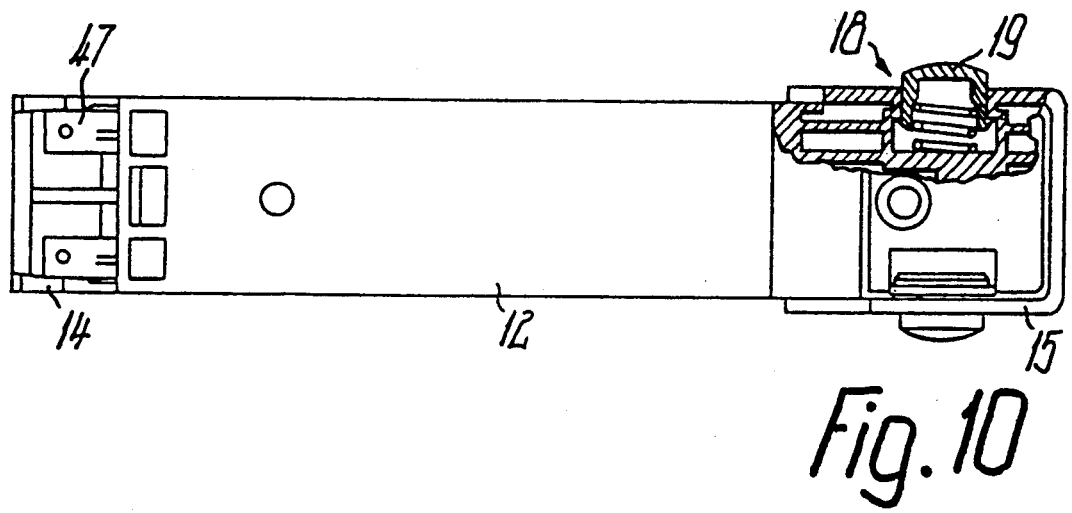
FIG. 10 shows a holder according to FIG. 3 in plan view.

The power supply device 1 according to FIG. 1 is used in connection with an appliance or tool grip 3 of an appliance 2 e.g. constructed as an electric tool. In the represented embodiment the grip 3 is constructed as a handle grip. Grip 3 forms an upper longitudinal web a gripping to be grasped with one hand and a grip web 5 spaced parallel below the web 4. On the inside of the gripping web 4, a pushbutton switch 6 for switching the appliance 2 on and off. The appliance grip 3 is, according to FIG. 5, constituted by two lateral grip shells 7 connected in the longitudinal direction thereof and which can be a one-part component of casing shells of the appliance casing. The appliance grip 3 forms a reentrant angle zone facing the gripping web 4 and this is in side view so adapted to the outer shape of the supply device 1, that the latter is located substantially entirely within said angle zone and forms extensions of the lateral faces, as well as the rear end face and also the boundary face of grip 3 remote from the gripping web 4. On the rear end of the angle side of the reentrant angle roughly parallel to the gripping web 4, the appliance grip 3 forms an angular recess 8 in side view extending up to the rear end face and over the width thereof and which is located directly behind the opening between the gripping web 4 and the grip web 5. In the other, shorter angle side, the appliance casing forms a further, e.g. pocket-shaped recess 9, which is provided directly following onto the transition area of the two angle sides which are at an obtuse angle to one another. The component of the supply device to be arranged on appliance 2 essentially comprises a box-like storage unit 10 and a holder 11, which is much smaller than the storage unit 10 and which is essentially to be fixed to the longer angle side, said holder 11 forming the detachable connection between the storage unit 10 and the appliance 2. Holder 11 has a few, e.g. less than 10 mm thick flat web 12, which is substantially completely embedded in a depression on the underside of the appliance grip 3 or grip web 5, or can be so constructed that it substantially completely forms said grip web 5.

The flat web 12 extending only over part of the grip width forms on its lower flat side, a substantially planar, through, closed or ribbed counterbearing surface 13 for storage unit 10, extending approximately over the entire length of holder 11. At the front end, the holder 11 forms a securing leg 14 projecting in one piece from the flat web 12 over the counterbearing surface 13 corresponding to the angle of the reentrant angle and which is substantially completely embedded in recess 9 in such a way that its inside is connected approximately flush to the inside of the associated angle side. At the other end, the flat web 12 passes into a locking casing 15 also constructed in one piece therewith and projecting in the opposite direction and which forms the associated end portion of the counterbearing surface 13 and engages in recess 8. The locking casing 15 is slightly wider than the flat web 12 so that its lateral faces are connected flush to the lateral faces of grip web 7 and it essentially forms at least part of the connecting web between gripping web 4 and grip web 5. In the vicinity of the locking casing 15, and optionally in the vicinity of the flat web 12, are provided counterbored holes for receiving fastening screws, with which the holder 11 can be secured in easily replaceable manner against at least one of the angle sides of the grip 3. The fastening screws are appropriately located in the separating plane between the grip shells 7. The connecting face 17 of holder 11, remote from the counterbearing surface 13, which is multiply offset and angled by the securing leg 14 and locking casing 15 and traversed by the fastening screws, is consequently set back laterally with respect to the lateral faces of grip 3 over part of the holder length, and in the vicinity of the locking casing 15 extends with its lateral faces 16 up to the grip lateral faces, so that there is a precisely centered reception of the holder 11. For the easy, but scarcely accidentally releasable securing of the storage unit 10 in the inserted state, is provided on holder 11 a lock 18 with two equiaxial locking members such as locking studs 19, which are springloaded and directed away from one another, and whose release handles are located on the storage unit 10. The cup-shaped, hollow locking studs 19, which recieve retaining springs, in the form of helical compression springs project with spherical segmental faces over the lateral faces 16 of the locking casing 15 adjacent to the counterbearing surface 13 and are secured in their projecting end positions by stop collars, which engage on the insides of the side walls of the locking casing 15. The locking studs 19 can be pressed into the locking casing 15 until the tops of their outer faces are flush with the lateral faces 16. As a result of the spherical segmental faces, the locking studs 19 essentially form insertion bevels.

The outer faces of the storage unit 10 are essentially formed by a casing. The casing has a lower casing shell 20 or can be open to full width towards its side associated with holder 11. The casing has a cap-like casing cover 21 with which it is possible to detachably close the opening of the casing shell 20. The casing shell 20 has a substantially through, planar casing bottom 22 and a front end wall 23 associated with the securing leg 14 of holder 11. The casing shell is intended for a substantially whole-area engagement on the associated angle side, as well as a facing, rear end wall 24, which is parallel to the front end wall 23 over part of its height connected to the casing bottom 22. The casing wall 23 is at an acute angle to the casing bottom 22, so that in side view, there is a parallelogram-shaped limitation of the casing.

On the casing cover 21, substantially completely forming the top of the casing, a depression 25 passes over the casing length and has a width and depth which are adapted to the shape of the flat web 12 and the locking casing 15. The bottom 26 of depression 25 is essentially formed by the wall of casing cover 21 parallel to casing cover 22. Two parallel, hollow longitudinal webs 27 connected to the front end of the casing cover 21 project on either side over the casing bottom 26, and the height of said webs 27 is slightly greater than the thickness of the flat web 12. Their outer web flanks are connected substantially flush to the side walls of the casing. The rear ends of the longitudinal webs 27 rise to two lateral plates 28 projecting over the depression bottom 26, which are also slightly higher than the locking casing 15, and in side view, have roughly the same shape as the latter. Thus, the flat web 12 and the locking casing 15 can be substantially or laterally shielded in the depression 25. On their facing insides, the longitudinal webs 27 and the plates 28 have introduction bevels 29 passing into one another in the manner of chamfers, which facilitate during insertion, the automatic alignment of the storage unit 10, and also run up onto the insertion bevels of the locking studs 19, so that the studs 19 can be automatically turned back until they lock in openings on the insides of plates 28 and consequently positively secure the storage unit 10.

The depression bottom 26 forms over the entire width between the longitudinal webs 27 and the plates 28, a substantially through, planar bearing surface 30 for bearing on the counterbearing surface 13 of the holder 11. The bearing surface 30 extends in slot-like manner over the entire length of the storage casing and is laterally shielded by the longitudinal webs 27 and the plates 28. Appropriately, between the longitudinal webs 27, the flat web has a lateral clearance with respect to the storage casing, while the rear end of the holder 11, formed by the locking casing 15, engages laterally in an almost clearance-free manner between the plates 28.

Pushbuttons 31, which are accessible from the outside, are moved into the inner locking openings of the locking studs 19 so that they force the studs 19 back into their release positions counter to spring tension. Thus, with the storage unit 10 inserted, each pushbutton 31 is appropriately equiaxial to it associated locking stud 19, and its inner face can form a circular reception depression for the engagement of the face of the locking stud 19. The pushbuttons 31, which are optionally outwardly spring-loaded with compression springs located within the hollow plates 28, and which surround the same, are accessible with widened, pushbutton-like heads on the outsides of the plates 28 and form on their outer end sides finger cavities. The pushbuttons 31, limited to the outside in a similar manner to the locking studs 19, can be mounted in the legs of a bow-shaped member, which surrounds the outside of the storage casing on the side walls and casing bottom 22. The bow-shaped member and is inserted with an inwardly directed collar, located in the vicinity of its leg ends, from the outside into the through openings of the bearing plates 28 for pushbuttons 31, so that said bow-shaped member forms an additional securing means for the casing cover 21, with respect to the casing shell 20. In the vicinity of the rear end of casing cover 21 a screw is inserted in the bearing surface 30 for securing the same. The shank engages in a reception eyelet on the inside of the rear end wall 24. As a result of the described construction of plates 28 and pushbuttons 31, a grip is formed for securely holding and carrying the storage unit 10.

At the front end and spaced from the bottom wall 22 or closer to the bearing surface 30, the storage casing has a hinged cam 32 which is much narrower than its width and which projects in web-like manner over the outside of the end wall 23. The cam 32 is located immediately adjacent to the separating plane between the casing shell 20 and the casing cover 21 and is constructed as a one-part component with shell 20. On either side of said hinged cam 32 and roughly at the same level, the casing cover 21, according to FIG. 3, so engages hook-like securing cams in the openings of end wall 23, that following the release of the rear securing screw, the rear end of the casing cover 21 can be raised in hinge-like manner about a joint axis formed by said securing cams, and the casing cover 21 can then be separated from the casing shell 20 by rearward force. The securing leg 15 of holder 11 has, on its inside and immediately adjacent to its free end, a cam pocket 33 adapted to the hinged cam 32 and widened towards its pocket opening. The cam pocket 33 forms a joint opening for the articulated engagement of the hinged cam 32. The lower limiting surface of the pocket opening 23 facing the counterbearing surface 13 is, in cross-section, slightly convex, so that the hinged cam 32 can easily roll on its flank face at right angles to the end wall 23. Consequently a hinge axis is defined, which is located in the transverse direction of holder 11 and parallel to the bearing and counterbearing surfaces 30, 13, as well as to the center axis of locks 18. For the insertion of storage unit 10, the latter is moved up to the holder 11 in the sloping position, according to FIG. 1, in such a way that the hinged cam 32 enters the cam pocket 33, and then the storage unit 10 is pivoted against holder 11 about the hinge axis and simultaneously is moved even further into the cam pocket 33, until the locks 18 lock in the described manner, and the hinged cam 32 engages in almost clearance-free manner in the cam pocket 33. Thus, the storage unit 10 is secured much in the same way as a three-point suspension, and the securing of the front end is located below the bearing surface 30 and the securing of the rear end is located above said bearing surface 30.

For the easily separable, electrical line connection between storage unit 10 and the appliance 2, on holder 11 and the storage casing are provided associated contact pairs, which are in each case formed by two contacting contacts 38, 39. The contacting contacts 38 of storage unit 10 are provided on an insulating material component, e.g. an insulating wedge 34 which can be easily detached from the storage casing and which is substantially entirely located within the latter and is only connected by means of plug connections to the casing shell 20 and/or the casing cover 21. In the represented embodiment, the insulating wedge 34 is so inserted, with a wedge leg roughly parallel to the end wall 23 and at a limited distance therefrom, in lateral plug guides 36 of casing shell 20, that its other wedge leg is roughly located in the plane of the depression bottom 26 and engages in an opening 35 extending over the entire width of the bearing surface 30 adjacent to the front end of the storage casing. This rearwardly directed wedge leg, extending over the inner width of the casing shell 20 and supported on the upper ends of the plug guides 36, engages below the longitudinal webs 27 on either side, so that on either side of opening 35 it is secured by its undersides against the engagement on the casing shell 20 and is fixed between the latter and casing cover 21. On removing the casing cover 21, the latter is automatically detached from the insulating wedge 34 and subsequently the latter can be drawn out of the opened casing shell 20, so that all the contacting contacts 38 of storage unit 10 provided on the insulating web 34 can be replaced.

Figure 3:
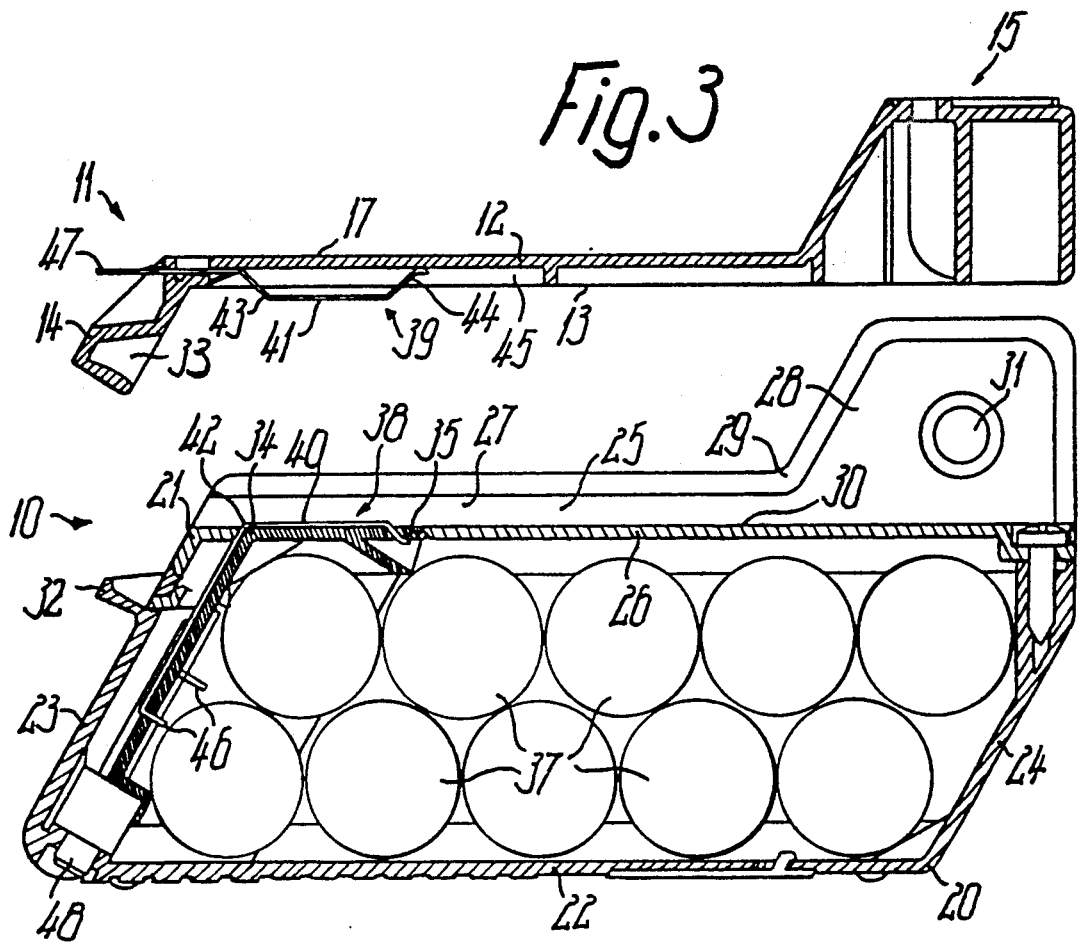
FIG. 3 shows the holder and storage unit according to FIG. 1 in longitudinal section and disassembled state.
Figure 4:
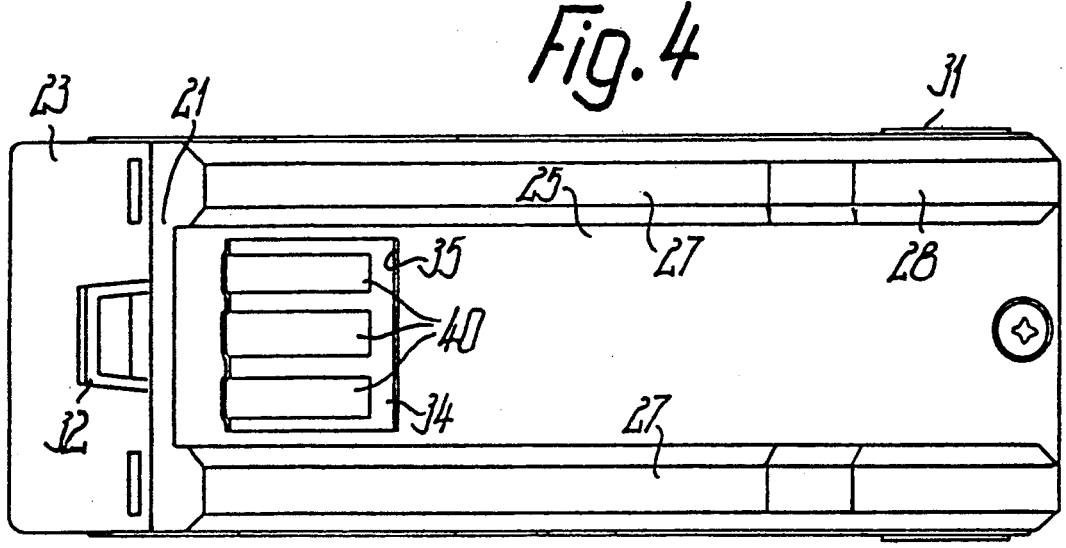
FIG. 4 shows the storage unit according to FIG. 3 in plan view.
Figure 11:
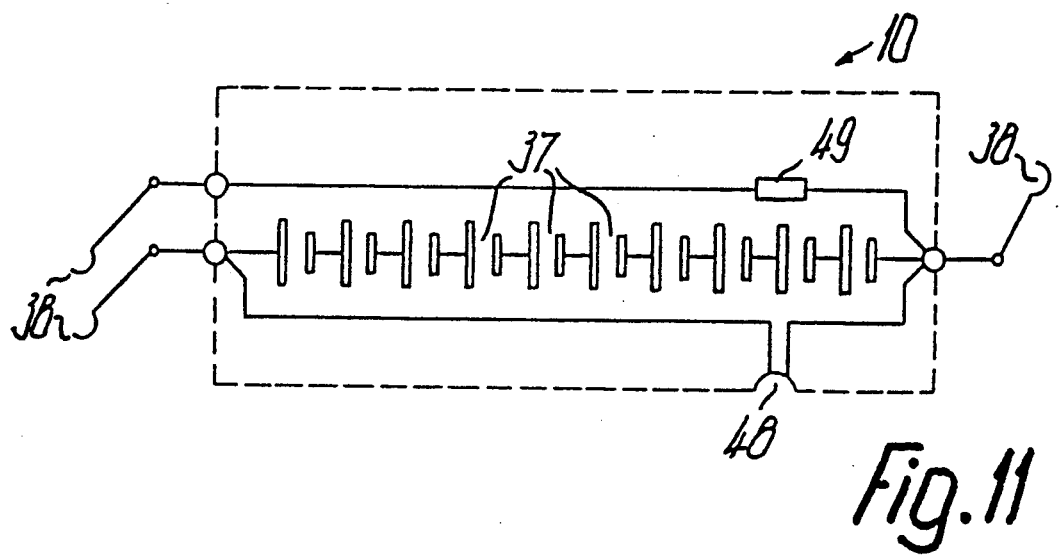
FIG. 11 shows the electric circuit of the storage unit.

As shown in FIG. 3, the storage casing is appropriate for the reception of a plurality of identical, substantially cylindrical and parallel storage cells 37, which are arranged in superimposed manner in two rows or are staggered on one another. The common axial plane of two adjacent storage cells 37 of two rows define the inclined position of the end walls 23, 24, which are approximately parallel to said axial plane or planes. The center axes of the storage cells 37, parallel to the bottom wall 22 or to the bearing surface 30, are at right angles to the side walls of the storage casing. The inside width of the casing corresponds to the length of the storage cells 37. On the insides of the side walls conductor bridges are provided (not shown), which in each case electrically connect the two different poles to the ends of two adjacent storage cells 37, so that all the storage cells 37, according to FIG. 11, are connected in series. The conductor bridges form contact springs for easily detachable engagement with the cell poles, so that the storage cells 37 can be replaced at any time. The two front, superimposed cells 37 engage in the reentrant angle zone of insulating wedge 34, so that a very compact reception of the cells 37 is ensured.

The storage unit 10 has three juxtaposed contacting contacts 38 at right angles to the longitudinal direction thereof and positioned in a common plane. The length of said contacts is much greater than the width, while their intermediate spacings are smaller than the width. The two outer contacting contacts 38 transmit current from and for the normal charging of the storage cells 37, while the middle contacting contact regulates rapid charging, accompanied by the interconnection of an overload safety device for the storage cells 37, e.g. in the form of a NTC element. The contacting contacts 38, extending over only part of the length of the associated angle side of the insulating wedge or angle 34 and displaced laterally inwards with respect to the webs 27 or the lateral edges of the opening 35, are formed by intermediate portions of contact strips 42. The strips 42 have a constant width over their length, and in the vicinity of the contacts 38, engage flatly on the outside of the associated angle side of the insulating wedge 34, located roughly in the plane of bearing surface 30, so that they project over said bearing surface 30 by their strip thickness, which can be only a few tenths of a millimeter or below a millimeter and are exposed there between the longitudinal webs 27. The rear ends of the contact strips 42, adjacent to the free angle side, are inserted in angled manner from the outside into slots of said angle side and are consequently positionally secured. The other ends of the contacting contacts 38 pass in angular manner into portions, which also engage flatly on the outside of the upright angle side and whose ends also traverse separate slots of said angle side. The ends projecting over the slots can be twisted or angled, so that the contact strips 42 are arranged in positionally rigid manner on the insulating web 34 without additional fastening means. The last-mentioned ends of the contact strips 42 form connecting lugs 46, e.g. plugging and/or soldering lugs, which are connected to two adjacent conductor bridges located on the same side of the casing via short cable portions, optionally accompanied by the interconnection of the regulating member.

To the extent that the holder 11 transmit current from the storage unit 10, it only has two contacting contacts 39, which are associated with the two outer contacting contacts 38 of the storage unit 10. These contacting contacts 39 are formed by contact strips 43 corresponding in cross-section to contact strips 42 and which are fixed to the holder without additional fastening means, by merely inserting or optionally using stops or locking members. These contacting contacts 39 are formed by planar strip portions, which at both ends pass into obtuse-angled strip legs. The strip legs are supported on the bottom of slot-like depressions 45 in the counterbearing surface 13 of holder 11. The rear strip leg formed by the associated strip end forms a support surface curved in ski-like manner, while the other strip leg passes into an approximately planar or linear connecting lug 47. The lug 47 is inserted in a slot of holder 11 and is adapted to its crosssections from the associated end limitation of depression 45 in such a way that it projects in freely accessible manner on the outside of securing leg 47 and can be connected to the associated appliance connection. On either side of the slot, the contact strips 43 can be supported with forked or drop-in tongues, bent therefrom in barb-like manner, and are consequently secured against longitudinal displacements. As a result of the described construction, the strip legs form contact springs 44, which make it possible to move the contacting contact 39, counter to spring tension in substantially parallel manner towards the counterbearing surface 13. The maximum spring displacement is limited to a few millimeters, particularly less than 5 mm and preferably approximately 2 mm, so that the contacting contact 39, in the unloaded state, only projects by a corresponding amount over the counterbearing surface 13. During the transverse movement, the contacting contact 39 simultaneously undergoes a small longitudinal movement, resulting from the pivoting movement of the strip leg being connected to the connecting lug 47. As a result of this sliding longitudinal movement pressing along contacting contact 38, a particularly good contact is achieved between the two associated contacting contacts 38, 39.

As a result of the described construction, the large-surface, substantially rectangularly bounded and substantially planar contact faces 40, 41 of the contacting contacts 38, 39 are substantially parallel to one another and approximately congruent to one another in a plane, which approximately coincides with the plane of the bearing and counterbearing surfaces 30, 13 and is parallel to the hinge axis. For cleaning purposes, all the contacting contacts are easily accessible when the storage unit has been removed. As a result of the simultaneous displacement of the hinged cam 32 when pivoting in the storage unit, there is an advantageous longitudinal movement for contacting between the contact faces 40, 41. During unlocking of the storage unit 10, the contacting contacts 39 press away the storage unit.

As is also shown in FIGS. 3 and 11, on the outer contacting contacts 38 of storage unit 10, provided a secondary connection 38 is provided, e.g. in the form of a coaxial socket, which is also accessible from the outside of the storage casing if the latter is positioned on the holder 11. Connection 48 is appropriately arranged substantially flush in the casing shell 20, and e.g. arranged adjacent to its front end wall 38, and is accessible from the underside or from the casing bottom 22. The secondary connection 48 can e.g. be used for charging the storage cells 37 or for removing current if the storage unit 10 is located in the operating position on an appliance. Consequently, its contacting contacts 38 are already occupied or inaccessible. The regulating member for rapid charging is designated 49 in FIG. 11.

Figure 2:
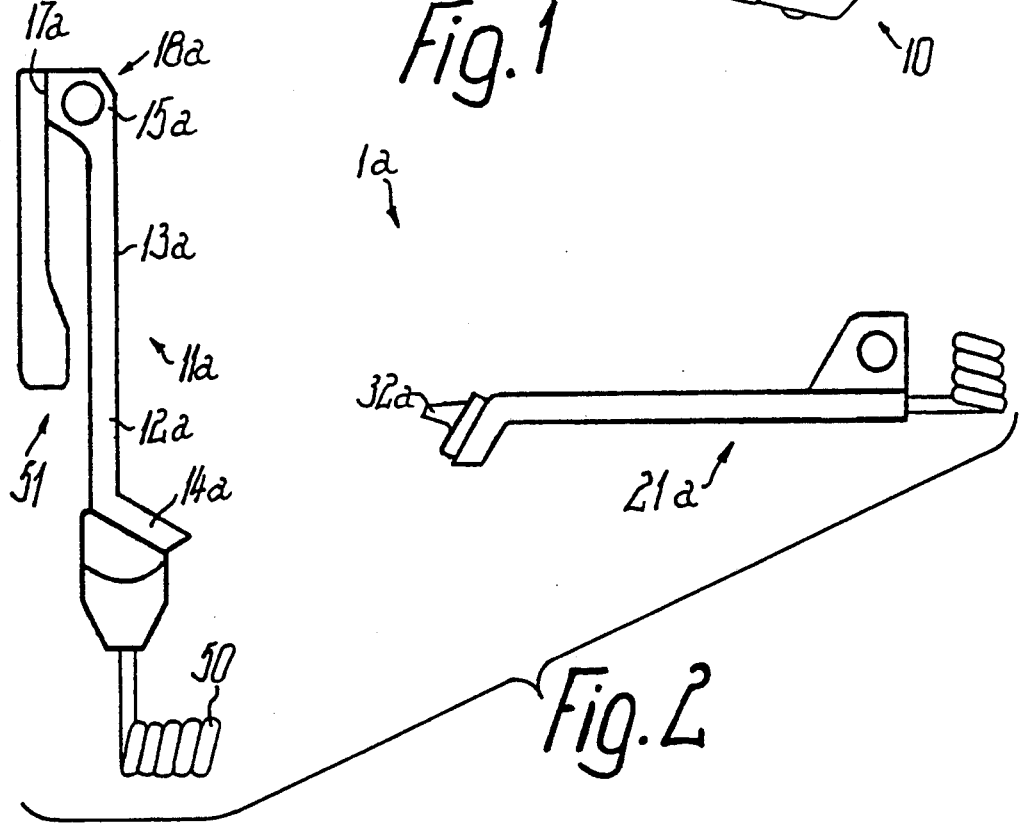
FIG. 2 shows another embodiment of the supply device for the use of the storage unit according to FIG. 1.

The holder 11a for receiving the storage unit can, as shown in FIG. 2, also be constructed for use in spaced manner from the appliance so as to be operated as a stand holder for mounting on a surface, such as a wall holder for hanging on a wall, for carrying in a pocket, box or the like. In this case, at least the contacting contacts of the holder 11a, used for current removal or drain purposes, are connected with the appliance by means of a flexible connecting cable 50, whose length can be greatly extended, e.g. by coiling, and led away from its associated leg 14a. The appliance can be provided in the aforementioned manner with a plug-in shoe 21a, which in much the same way as described relative to casing cover 21, has correspondingly arranged contacting contacts, locking studs and a hinged cam 32a. At the rear end of said plug-in shoe 21, the connecting cable 50 is supplied. As a result of the external mounting of the storage unit, the handling weight of the appliance can be greatly reduced. In the represented embodiment, the holder 11a is provided with a retaining clip 51 or can be constructed as a retaining chip. The flat web 12a forms a clip leg with a leg 14a located on the free end. On the side of the locking casing 15a, associated with the bearing surface 17a, a further, shorter leg projects freely roughly in the same direction, so that said holder 11a can be carried on the body, e.g. by engaging a waistband. Otherwise in FIG. 2, corresponding parts are given the same reference numerals as in the other drawings, but with reference letters.

Figure 12:
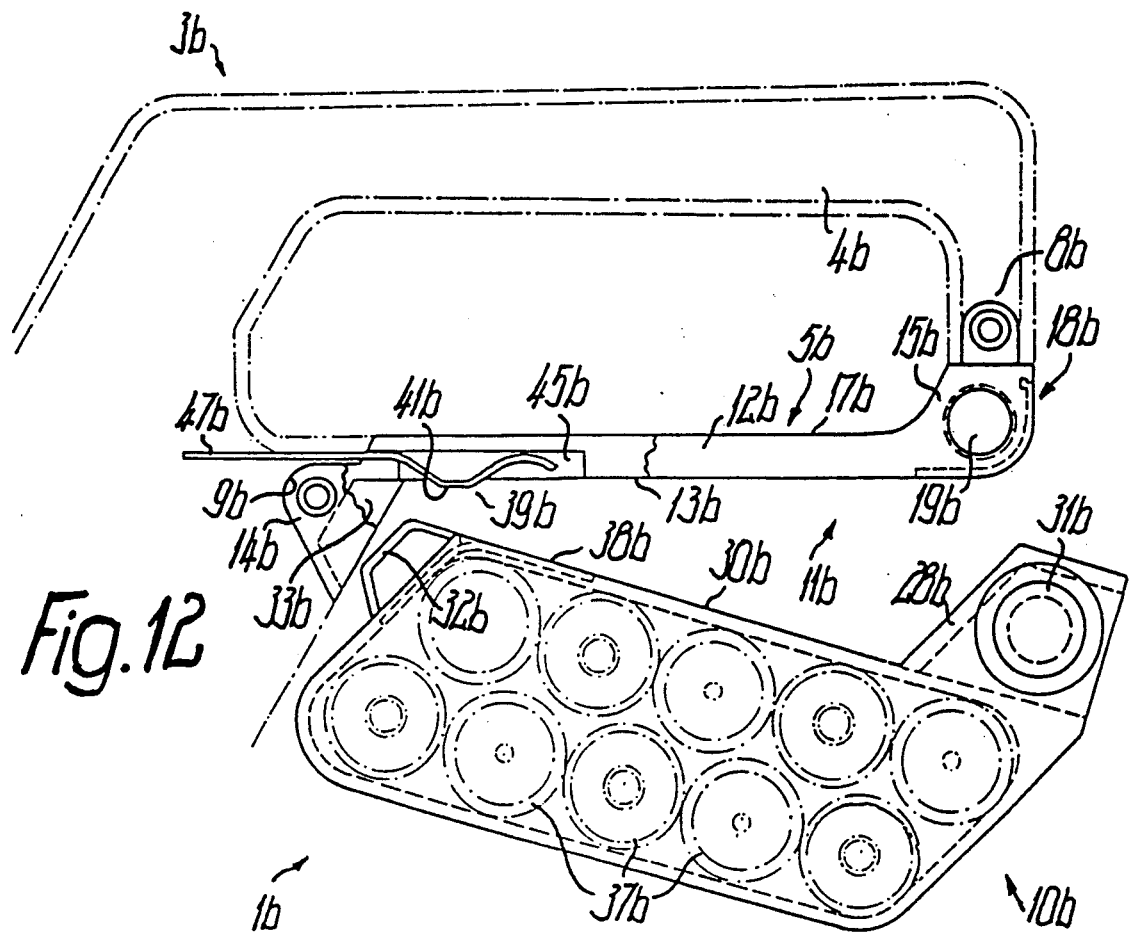
FIG. 12 shows another embodiment of a supply device in a view corresponding to FIG. 1.
Figure 13:
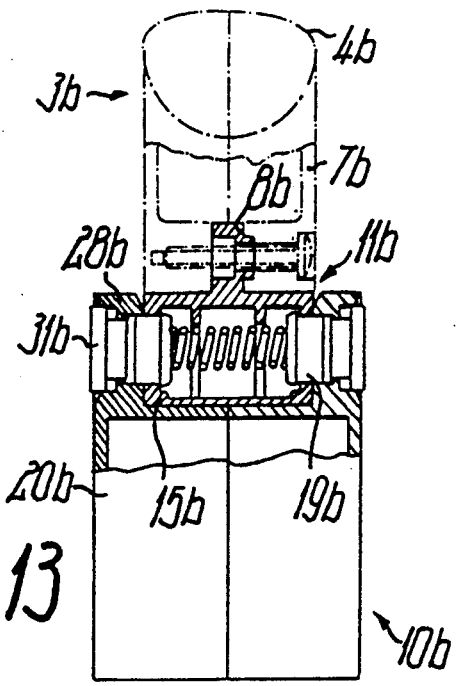
FIG. 13 shows a cross-section through the supply device according to FIG. 2, but in the assembled state.

In the case of the embodiment according to FIGS. 12 and 13, the appliance grip 3b and storage cells 37b are shown in dot-dash line manner. The flat web 12b of holder 11b, in the manner of a bridge, completely forms the grip web 5b, so that the holder 11b is only fixed by its ends, namely, the securing leg 14b and the locking casing 15b to the appliance grip 3b and the web side remote from the counterbearing surface 13b form the associated inner boundary of the grip opening. The contact faces 41b of contacting contacts 39b of holder 11b are shorter than those of the contacting contacts 38b of storage unit 10b, so that a higher specific contact surface pressing is obtained. The bearing surface 30b and the contact contacts 38b are not laterally shielded by longitudinal webs, and instead, are locate on the top of the storage casing, substantially planar and continuously over the entire width and above which project the plates 28b. The hinged cam 32b, which is approximately trapezoidal in side view, is in this case, bow-shaped, so that it can also be used in the manner of a carrying or hanging hook. The storage casing essentially comprises two lateral, approximately mirror symmetrical casing shells 20b, which are connected to one another along a median, longitudinal plane at right angles to the bearing surface 30b, and whereof each is constructed in one piece with one of the plates 28b, so that there is no need for a separate casing cover. In this case, no separate return springs are provided for the pushbuttons 31b, and instead, they are pressed into the starting position by the spring acting on the locking studs 19b. By means of a shoulder projecting over the top of the lock casing 15b, holder 11b is inserted in a recess 8b between the grip shells 7b and is transversely traversed by a screw securing said shells, so that a very simple fastening is obtained. The two locking studs 19b are loaded by a common compression spring located between them, so that, on operating only a single pushbutton 13b, the facing locking stud 19b is forced with increased force into its locking position. The lateral faces of the storage unit 10b project laterally over the lateral faces of the appliance grip 3b roughly by the thickness of plates 28b. Otherwise, in FIGS. 12 and 13 corresponding parts are given the same references as in the other drawings, but followed by the letter b, so that the corresponding description parts again apply.

Figure 14:
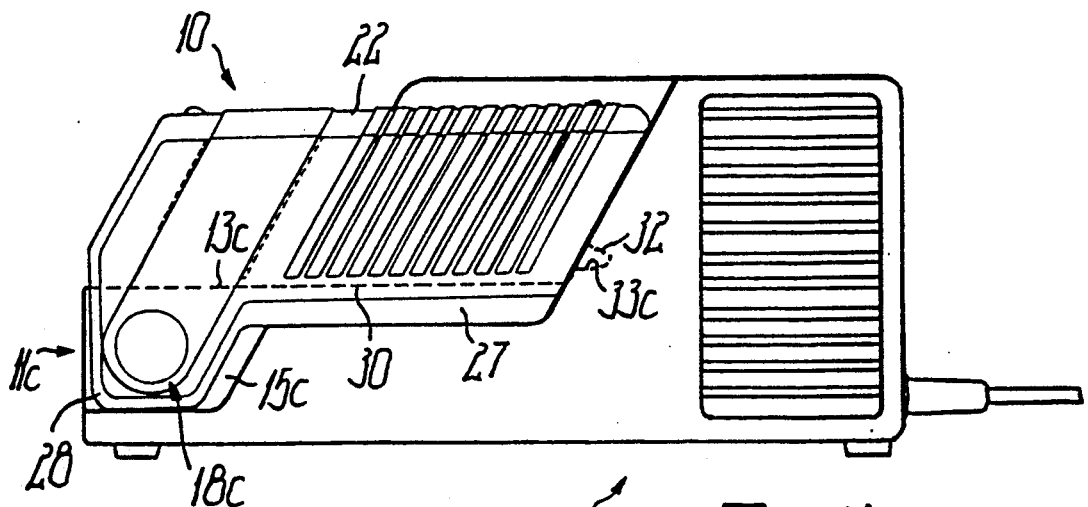
FIG. 14 shows a charger for the storage unit.
Figure 15:
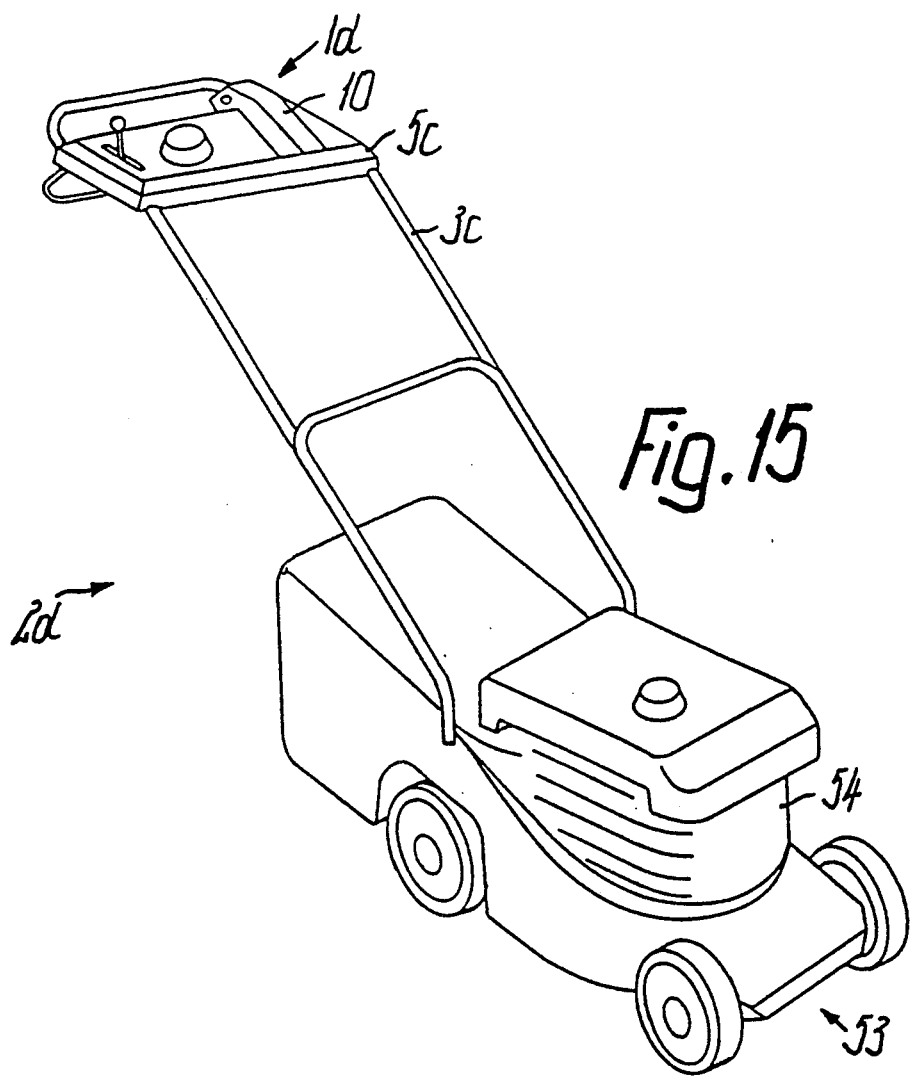
FIGS. 15 to 18 show Embodiments for the use of the supply device.

FIG. 14 shows a rapid charger 52 for the storage unit 10. The casing of the charger 52 is substantially integrated in one piece with a holder 11c, so that its counterbearing surface 13c is located at the top or on a side remote from the standing surface of changer 52. Thus, the storage unit 10 is inserted in the charger 52 with the base wall 22 at the top and downwardly directed plates 28. Its end region, at the front remote from the plates 28, engages in a recess of the casing of the charger 52 in such a way that it is laterally shielded over the entire height thereof. For the reception of the hinged cam 32, the charger 52 also has a cam pocket 33 and is provided with a lock 18c for securing the other end of the storage unit 10. Adjacent to the end of the receptacle for the storage unit 10, associated with the cam pocket 33c, the electrical operating parts are housed in the casing of the charger 52, while the other end of the charger casing terminates with the associated end of the storage unit 10. The charger can be provided on either side of its contacting contacts with webs, ribs, etc., which engage in corresponding slots of the bearing surface 30 or the insulating wedge 34. The webs also laterally shield the contacts and serve as spacers to prevent" short-circuits by metal parts passing into the vicinity thereof. Corresponding webs can also be provided laterally of the contacting contacts 38 and can engage in slots of holder 11c. Between the contacts 38 therefore a web is provided on the insulating wedge 34 and the counterbearing surface 13c has webs on the outsides of the outer contacting contacts. In FIG. 15, the appliance shown is a lawnmower 2d, which is provided on a chassis 53 with an internal combustion engine 54 with an electric starter (not shown). The lawnmower 2d is moved by pushing or pulling using a rearwardly projecting and rising handle 3c. In the upper end region, the legs of the handle 3c are interconnected by a control panel 5c on which are provided the operating members for the manual control of the lawnmower 2d or the internal combustion engine 54. The control panel 5c is provided with a holder (not shown for receiving the storage unit 10 on the top of control panel 5c, the connecting lugs of the holder being conductively connected to the electric starter. The storage unit 10 can also electromotively drive an intermediate means, e.g. a spring storage means, which in the charged state can serve as a starter for the motor, the starter power being higher than that of the storage unit.

Figure 16:
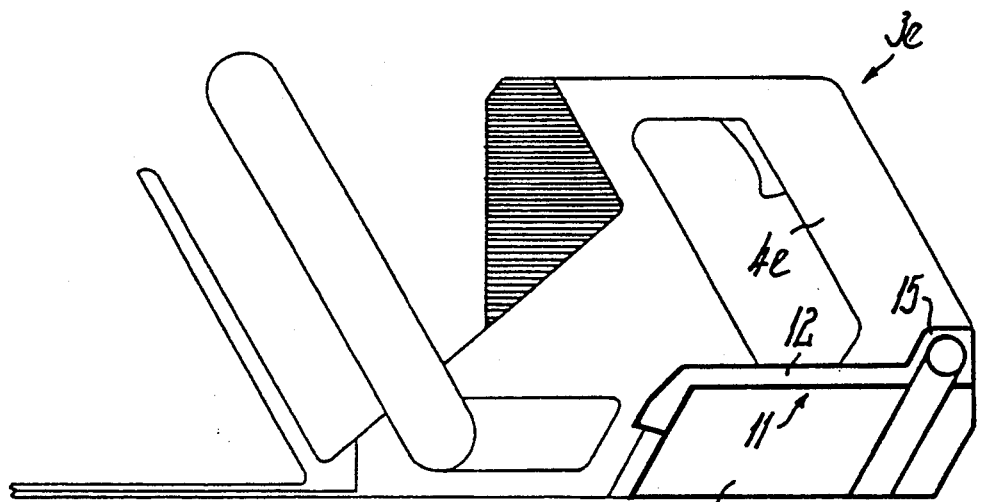

In FIG. 16, the arrangement of the supply device 1 on an electric tool, in which the tool is shown grip 3e or the gripping web 4e are inclined forwards with respect to the tool working plane, as occurs e.g. with hedging shears. The gripping web 4e is in this case positioned transversely over the holder 11. The lock çasing 15 engages in the lower end of the gripping web 4e. The grip opening being located roughly in the vicinity of the center of the length of the flat web 12, so that the latter can form its associated boundary. The bottom wall of the inserted storage unit 10 terminates flush with the underside of the appliance 2e or with its casing, so that the storage unit 10 can form an extension of the standing surface of the appliance when it is laid down. In this deposited state, the connection between the storage unit 10 and the appliance 2e is relieved.

Figure 17:
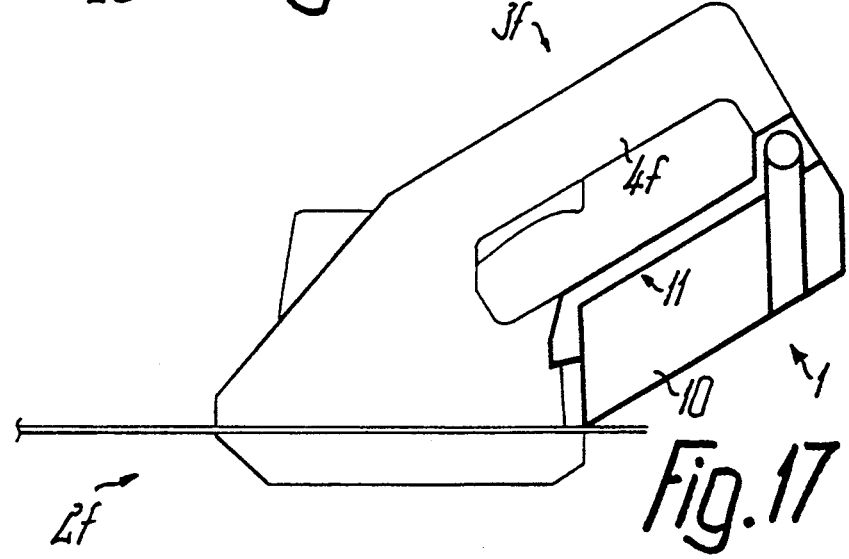

FIG. 17 shows an appliance 2f with an appliance grip 3f sloping rearwardly from the tool working plane or rising from the working area of the tool and a gripping web 4f. The supply unit 1 correspondingly rises on the underside of the grip 3f and is located above the tool working area. This appliance 2f can e.g. be electric shears.

Figure 18:
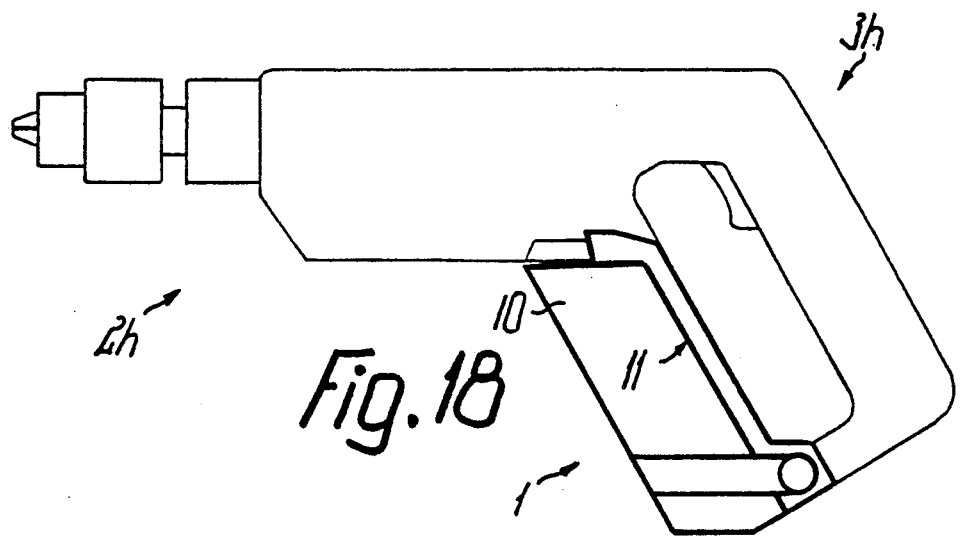

Whereas in the case of the constructions according to FIGS. 16 and 17 appliances with reciprocating working movements are involved, FIG. 18 shows an electrical appliance 2h with a rotary working movement, namely a hand held or portable drilling machine, which has a working spindle accessible at one end for tool reception. At the other end of the appliance 2h, a sloping appliance grip 3h is located substantially below the spindle axis. The supply device 1 is located on the front of the appliance grip 3h and below the spindle or motor casing of appliance 2h. Each appliance provided with an appropriate holder 11 can be equipped with the same or a similar storage unit 10 for power supply purposes.

What is claimed is:

1. An electric power supply assembly for a cordless electric appliance, said assembly comprising:
 at least one power storage unit;
 a mounting support having at least one holder for removably receiving said storage unit, said holder having a first engaging surface and said storage unit having a second engaging surface for removably engaging said first engaging surface, said first engaging surface and said second engaging surface defining a contact plane when engaged;

at least one holder electric contact provided on said holder; and at least one storage unit electric contact provided on said storage unit, said holder electric contact and said storage unit electric contact providing electrical connection when engaged, at least one of said holder electric contact and said storage unit electric contact providing a contact face aligned in a plane substantially parallel to said contact plane, wherein said holder electric contact and said storage unit electric contact engage and disengage in a connecting direction transverse to said contact plane by pivotal mounting and dismounting of said storage unit with said holder and wherein at least one of said holder electric contact and said storage unit electric contact is resiliently flexible in a direction substantially parallel to said connecting direction.

2. The supply assembly according to claim 1, wherein at least one of said holder electric contact and said storage unit electric contact is provided in flat, elongated, strip-like manner, substantially parallel to said contact plan.

3. The supply assembly according to claim 1, wherein said holder electric contact and said storage unit electric contact are juxtaposed in a parallel manner.

4. The supply assembly according to claim 1, wherein said holder electric contact and said storage unit electric contact are strips having a length extension and removably engage one another over most of said length extension.

5. The supply assembly according to claim 1, wherein at least one of said holder electric contact and said storage unit electric contact is substantially disposed in said contact plane.

6. The supply assembly according to claim 1, wherein said storage unit electric contact is rigidly mounted and is raised substantially only by a contact strip thickness over the second engaging surface.

7. The supply assembly according to claim 1, wherein said holder electric contact moves in a depression in said first engaging surface.

8. The supply assembly according to claim 1, wherein said storage unit and said holder pivotally separate about a hinge axis and said storage unit has an end edge a distance from said hinge axis, said holder electric contact and said storage unit electric contact being disposed closer to said hinge axis than to said storage unit end.

9. The supply assembly according to claim 8, wherein at least one of said holder electric contact and said storage unit electric contact is located substantially at a right angle to said hinge axis.

10. The supply assembly according to claim 1, wherein said storage unit is removably secured in an attached state to said holder with at least one lock means having at least two separately operable pushbutton locks located on remote sides of said supply assembly.

11. The supply assembly according to claim 10, wherein at least one of said at least two pushbutton locks is provided proximate a shield of said storage unit, said shield laterally engaging over said holder.

12. The supply assembly according to claim 10, wherein said at least two locks have adjacent pushbuttons, a release pushbutton on said storage unit and a locking stud on said holder, said locking stud being located in a movement path of said release pushbutton, at least one of said pushbuttons being spring loaded towards a locking position.

13. The supply assembly according to claim 1, wherein said holder is formed by a preassembled component constructed to be fixed to said appliance as a unit.

14. The supply assembly according to claim 1, wherein said holder has a flat web with a surface and a securing leg projecting at one end of said web at an angle over the surface of said web for removably engaging with a projecting hinged cam of said storage unit.

15. The supply assembly according to claim 1, wherein said holder has a locking casing projecting in a direction away from said first engaging surface.

16. The supply assembly according to claim 1, wherein, in an attached state, said holder is substantially embedded in a recess provided by at least one of said storage unit and appliance.

17. The supply assembly according to claim 1, wherein, in an attached state, said storage unit and said holder engage one another by means of a three-point connection.

18. The supply assembly according to claim 1, wherein a hinged cam, dimensioned narrower than a width of said storage unit, and two locks form three connecting points located at apices of an imaginary acute-angled triangle substantially inclined with respect to said contact plane.

19. The supply assembly according to claim 1, wherein said holder is substantially constructed as a casing.

20. The supply assembly according to claim 1, wherein said holder is substantially constructed as a grip part of an appliance grip, said grip part having a width and a length extension, at least one of said extensions being substantially the same as an associated extension of a grip web of said appliance grip.

21. The supply assembly according to claim 1, wherein said holder is connected to an electric starter of a motor.

22. The supply assembly according to claim 21, wherein said motor is a lawnmower internal combustion engine.

23. The supply assembly according to claim 21, wherein said holder is located on a control panel of a handle connected to said motor.

24. The supply assembly according to claim 1, wherein said holder is constructed separate from said appliance, said holder having a flexible supply line.

25. The supply assembly according to claim 24, wherein said holder is constructed as a plug-in retaining clip removably connectable to a body of an operator.

26. The supply according to claim 24, wherein said holder removably connects by means of a flexible connecting cable to at least one plug-in shoe electrically attachable to a second holder provided on said appliance.

27. The supply assembly according to claim 1, wherein said holder is part of a charger for a plurality of storage cells superimposed in two rows in said storage unit.

28. The supply assembly according to claim 1, wherein said storage unit has at least one electric secondary connection separate from said storage unit electric contact.

29. The supply assembly according to claim 1, wherein said storage unit has a bipolar socket.

30. The supply assembly according to claim 1, wherein said appliance is a portable electric driven tool.

* * * * *